United States Patent Office
3,293,375
Patented Dec. 20, 1966

3,293,375

TELEPHONE SET

Willy Lohs, Munich, Germany, assignor to Siemens & Halske Aktiengesellschaft Berlin and Munich, a corporation of Germany Filed Nov. 6, 1961, Ser. No. 150,467
Claims priority, application Germany, Nov. 24, 1960, S 71,394
4 Claims. (Cl. 179—100)

Figure 1:
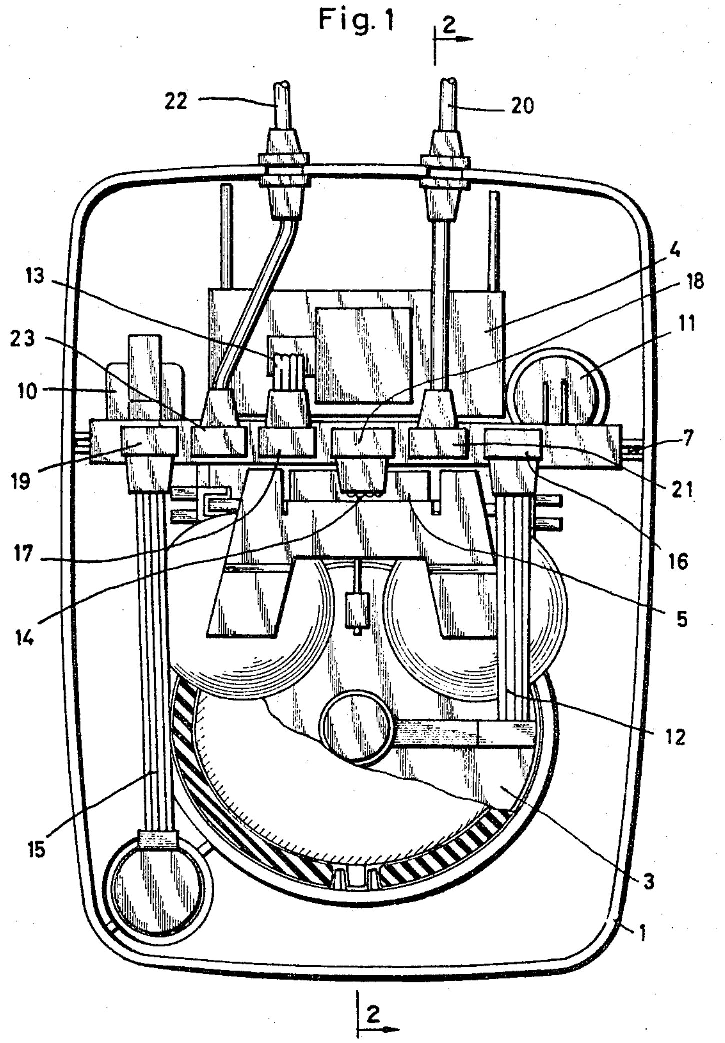

This invention is concerned with improvements relating particularly to the quality and durability and reliability of electrical connections in telephone sets.

It is known to provide the terminal wires of components of telephone sets with plug or connector means adapted to connect such terminal wires with the interior wiring of the respective set.

In a known arrangement of this kind, a telephone set is provided with an insulating plate carrying the interior wiring, formed, for example, by a printed circuit, such insulating plate being equipped with knife edge-like contacts projecting therefrom, to which the terminal wires of the component elements and of the apparatus cords are plugged so that they are solely supported thereby.

However, particularly high requirements are in connection with telephone sets posed so far as the quality and reliability of electrical connections are concerned, which are especially with respect to reliability not satisfactorily met by the above noted known arrangement.

The object of the present invention is to provide an arrangement which meets these requirements in simple manner and in the highest degree.

This object is realized by securing the plugged-in connections against inadvertent displacement thereof, utilizing for this purpose a housing part of the telephone set and particularly the base plate thereof.

The connections are in this manner established without any auxiliary fastening means, which would tend to complicate the construction of a telephone set, in a manner such that they cannot be loosened or inadvertently displaced even in the presence of severe shocks, thus avoiding the danger of disturbances. It is understood, of course, that another housing part, for example, the housing cover, may be utilized in place of the base plate for securing the respective connections.

The arrangement according to the invention also benefits the maintenance of telephone sets. For example, plug connections which are by the action of the base plate secured against loosening, will be freely accessible upon removal of the base plate, without requiring the release of any particular holding devices.

The plugged-in connections can be in simple manner secured by clamping them in position by the action of a housing part.

Elastic inserts are advantageously provided between the plug connections and the housing part lying adjacent thereto.

A further advantage is achieved, as compared with the known arrangement, by a feature of the invention according to which the terminal wires of the individual components and those of the apparatus cords are respectively provided with individual connectors or plugs. This feature considerably simplifies the assembly of telephone sets as compared with arrangements in which each individual terminal wire was provided with its individual connector or plug, and such feature is moreover of advantage in securing the plug connections, since the plug members, as compared with individual wire connections, form bodies with relatively large surfaces for engagement with the part of the housing which is utilized for securing them.

In order to avoid imparting stresses to the parts of the plug (pin or the like) employed for effecting the desired connections, upon clamping the plug means in position, the plug bodies are advantageously provided with extensions for guiding them with respect to the receiving means therefor.

Further details and features of the invention will appear from the description which is rendered below with reference to an embodiment thereof.

Figure 2:
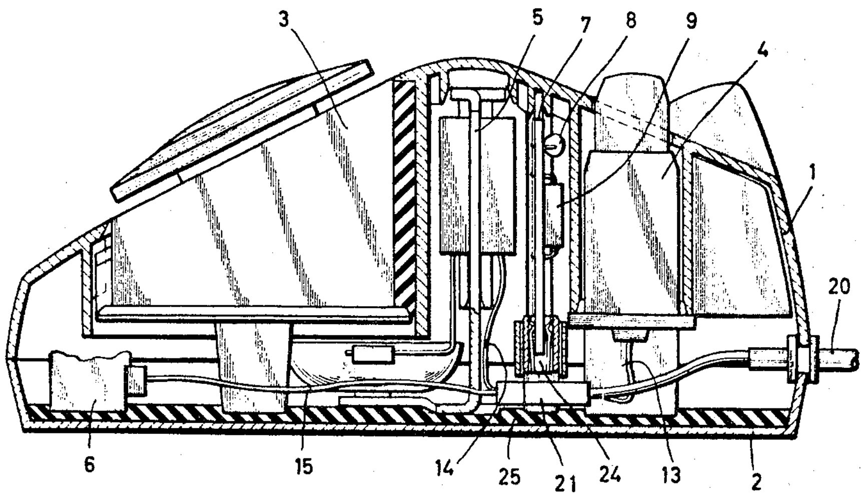

FIG. 1 shows a bottom view of the parts of a telephone station or set as seen upon removal of the base plate of the housing; and FIG. 2 represents a cross-sectional view of the telephone set, taken approximately on the line 2—2 of FIG. 1.

The housing of the telephone set comprises the cover 1 and the base plate 2. Within the housing cover 1 are arranged the dial mechanism 3, a switch hook device 4, the ringer 5, a grounding key 6 with its contact spring sets, and an insulating plate 7, such plate carrying the interior wiring for the telephone set and if desired also light weight components such as resistors 8 and 9, the induction coil 10 and a capacitor 11. The insulating wiring plate 7 is disposed within the housing cover in upright position, in a plane extending perpendicularly to the base plate 2. At the edge of the insulating plate which faces the base plate 2 are provided receiver or socket means for the plug or connector means of the terminals of the noted component elements of the telephone set as well as for connector or plug means for the wires of the apparatus cords 20 and 22. The terminal wires 12, 13, 14, 15, extending respectively from the dial mechanism 3, the switch hook device 4, the ringer 5 and the grounding key 6, are respectively connected with the plug or connector means 16 to 19, and the apparatus cords 20 and 22 are connected with plug or connector means 21 and 23.

The above noted edge of the insulating plate 7 also carries for these plugs socket or receiving means indicated at 24. In the closed condition of the housing, that is, with the base plate 2 attached in position on the cover 1, these plug or connector means are clamped in place between an elastic pad 25, extending along the base plate 2, and the corresponding edge of the insulating plate 7. The plugs are accordingly freely accessible upon removal of the base plate.

Changes may be made within the scope and spirit of the appended claims which define what is believed to be new and desired to have protected by Letters Patent.

I claim:

1. A telephone set comprising a base plate and a cover forming a housing, component elements disposed within the housing and cord means extending therefrom, means carrying the interior wiring for said telephone set including sockets for receiving said plug means, the terminal wires of said component elements and of said cord means being provided with plug means for establishing connections with said interior wiring, said plug means being in plugged positions thereof secured against displacement by the action of a part of said housing.

2. A telephone set according to claim 1, wherein said base plate in assembled position with said cover constitutes said housing part.

3. A telephone set according to claim 1, wherein the respective plug means are provided with extensions for guiding them for insertion thereof into said sockets.

4. A telephone set comprising apparatus components and apparatus cord means, individual plug means for each component and cord means, respectively, each plug means containing terminal wires forming part of a respective one of the component and cord means to which it is assigned, socket means for the respective plug means, and guide means for assuring correct plugging in of each plug means.

References Cited by the Examiner

UNITED STATES PATENTS

| | | | |
|---|---|---|---|
| 2,544,325 | 3/1951 | Johnson ----------- | 179—100 |
| 2,548,723 | 4/1951 | Houdek ----------- | 179—100 |
| 2,991,356 | 7/1961 | Harasek ------------ | 317—101 |

KATHLEEN H. CLAFFY, *Primary Examiner.*

THOMAS B. HABECKER, *Examiner.*

W. C. COOPER, *Assistant Examiner.*